US008429191B2

(12) United States Patent  (10) Patent No.: US 8,429,191 B2
Desai et al.  (45) Date of Patent: Apr. 23, 2013

(54) DOMAIN BASED ISOLATION OF OBJECTS

(75) Inventors: Saurabh Desai, Austin, TX (US);
George Mathew Koikara, Bangalore (IN); Pruthvi Panyam Nataraj, Bangalore (IN); Guha Prasad Venkataraman, Chennai (IN); Vidya Ranganathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 13/006,621

(22) Filed: Jan. 14, 2011

(65) Prior Publication Data

US 2012/0185510 A1  Jul. 19, 2012

(51) Int. Cl.
 *G07F 17/30* (2006.01)
(52) U.S. Cl.
 USPC ................................ 707/783; 715/789; 726/1
(58) Field of Classification Search .......... 707/781–789, 707/999.009; 715/789; 726/2, 1
See application file for complete search history.

(56) References Cited

U.S. PATENT DOCUMENTS

| 5,889,952 | A  | 3/1999 | Hunnicutt et al. |
| 6,519,647 | B1 | 2/2003 | Howard et al. |
| 6,947,989 | B2 | 9/2005 | Gullotta et al. |
| 7,017,183 | B1 | 3/2006 | Frey et al. |
| 7,167,983 | B1 | 1/2007 | Tiller et al. |
| 7,249,176 | B1 | 7/2007 | Salas et al. |
| 7,328,210 | B2 | 2/2008 | Barchi et al. |
| 7,591,015 | B2 | 9/2009 | Cargille et al. |
| 7,954,150 | B2 | 5/2011 | Croft et al. |
| 2003/0009685 | A1 | 1/2003 | Choo et al. |
| 2003/0041154 | A1 | 2/2003 | Tran |
| 2003/0191747 | A1 | 10/2003 | Espino |
| 2004/0239700 | A1* | 12/2004 | Baschy .......................... 345/781 |
| 2004/0243835 | A1 | 12/2004 | Terzis et al. |
| 2006/0117010 | A1* | 6/2006 | Hakala ............................ 707/9 |
| 2006/0248599 | A1 | 11/2006 | Sack et al. |
| 2006/0259487 | A1 | 11/2006 | Havens et al. |

(Continued)

FOREIGN PATENT DOCUMENTS

WO  WO2009023586  2/2009
WO  2010127380  11/2010

OTHER PUBLICATIONS

Alistair Crooks; "A Role-Bases Access Control Kernal for NetBSD"; http://www.ukuug.org/events/eurobsdcon2009/papers/role-based-access-control.pdf; Aug. 2009.*

(Continued)

*Primary Examiner* — Dennis Truong
(74) *Attorney, Agent, or Firm* — Kolisch Hartwell, PC; Steven L. Bennett

(57) ABSTRACT

Functionality can be implemented in an operating system to increase the granularity of isolation for objects. A domain can be defined to represent each of different entities (e.g., different departments or work groups). User identifiers and/or user credentials can be associated with the appropriate domain or domains. An administrator can then define a set of rules that govern operation(s) that can be performed on the objects based on the domains. Processes running on a system will inherit the domains of a user account logged into the system. When a process running on the system attempts to perform an operation on an object, an operating system process evaluates the domain isolation rules with an identifier of the object and a domain identifier to determine whether the operation is permitted to proceed.

19 Claims, 4 Drawing Sheets

U.S. PATENT DOCUMENTS

| | | | |
|---|---|---|---|
| 2007/0011136 A1 | 1/2007 | Haskin et al. | |
| 2007/0016583 A1* | 1/2007 | Lempel et al. | 707/9 |
| 2007/0039045 A1 | 2/2007 | McKee et al. | |
| 2007/0156691 A1* | 7/2007 | Sturms et al. | 707/9 |
| 2007/0214497 A1 | 9/2007 | Montgomery et al. | |
| 2007/0282951 A1 | 12/2007 | Selimis et al. | |
| 2007/0297396 A1 | 12/2007 | Eldar et al. | |
| 2008/0016580 A1* | 1/2008 | Dixit et al. | 726/27 |
| 2008/0071804 A1 | 3/2008 | Gunda et al. | |
| 2008/0126355 A1 | 5/2008 | Rowley | |
| 2008/0162707 A1 | 7/2008 | Beck et al. | |
| 2008/0289036 A1 | 11/2008 | Kandasamy et al. | |
| 2008/0307486 A1* | 12/2008 | Ellison et al. | 726/1 |
| 2009/0235167 A1 | 9/2009 | Boyer et al. | |
| 2010/0131559 A1* | 5/2010 | van Riel et al. | 707/783 |
| 2010/0191881 A1 | 7/2010 | Tauter et al. | |
| 2012/0030242 A1* | 2/2012 | Nakamura et al. | 707/781 |
| 2012/0059799 A1* | 3/2012 | Oliveira et al. | 707/656 |
| 2012/0102079 A1* | 4/2012 | French et al. | 707/827 |
| 2012/0151552 A1* | 6/2012 | Kandasamy et al. | 726/1 |
| 2012/0185510 A1* | 7/2012 | Desai et al. | 707/785 |
| 2012/0233670 A1* | 9/2012 | Bonnes et al. | 726/4 |

OTHER PUBLICATIONS

Robinson et al., "Domain-based access control for distributed computing systems", Abstract from Software Engineering Journal, Sep. 1988, 1 page.

Demchenko et al., "Domain Based Access Control Model for Distributed Collaborative Applications", Second IEEE International Conference on e-Science and Grid Computing, Dec. 2006, 8 pages.

IBM Corp "Role Based Access Control, AIX V6 Advanced Security Features: Introduction and Configuration", 2007, 85 pages.

IBM Corp., "Security in workload partition environments", Workload Partition Management in IBM AIX Version 6.1, 2008, 56 pages.

Milberg, "Cloud computing on AIX and POWER", IBM Corporation, Apr. 7, 2009, 11 pages.

Jeyapaul, "Understanding advanced AIX features: Role-based access control in simple steps", IBM Corporation, Jun. 23, 2009, 11 pages.

IBM Systems Magazine, Privileges Granted as Needed, http://www.ibmsystemsmag.com/aix/administrator/systemsmanagement/Privileges-Granted-as-Needed/, Jan. 2010, 3 pages.

Shwartz et al., "Quality of IT Service Delivery-Analysis and Framework for Human Error Prevention", Service-Oriented Computing and Application (SOCA), 2010 IEEE International Conference, Dec. 13-15, 2010, 8 pages, Perth, Washington.

Madduri et al., "Towards Mitigating Human Errors in IT Change Management Process", IBM Corporation, Lecture Notes in Computer Science, 2010, pp. 658-663,vol. 6470/2010.

Peter Mell et al., "The NIST Definition of Cloud Computing (Draft)", Recommendations of the National Institute of Standards and Technology, Jan. 2011, 7 pages.

IBM Corp., Domain RBAC, http://publib.boulder.ibm.com/infocenter/aix/v7r1/index.jsp?topic=/com.ibm.aix.security/doc/security/domain_rbac.htm, accessed on Apr. 29, 2011, publication date unknown, 4 pages.

IBM Corp., Role Based Access Control (RBAC), http://publib.boulder.ibm.com/infocenter/aix/v7r1/index.jsp?topic=/com.ibm.aix.security/doc/security/rbac.htm, accessed on Apr. 29, 2011, publication date unknown, 1 page.

IBM Corp., Enhanced RBAC Mode, http://publib.boulder.ibm.com/infocenter/aix/v6r1/index.jsp?topic=/com.ibm.aix.security/doc/security/rbac_enh_mode.htm, accessed on Apr. 29, 2011, publication date unknown, 2 pages.

Balbiani et al., "A logical approach to dynamic role-based access control", publication date unknown, 17 pages.

Abdullah, Ariff et al., "FreeBSD Handbook", Chapter 13, Section 8, http://www.freebsd.org/doc/en/books/handbook/users-groups.html (Date Obtained from the Internet: Aug. 25, 2010) 2010, 2 pages.

Barkley, John , "Comparing Simple Role Based Access Control Models and Access Control Lists", *Proceeding RBAC '97 Proceedings of the second ACM workshop on Role-based access control* http://delivery.acm.org/10.1145/270000/266769/p127-barkley.pdf?key1=266769&key2=2108522921&coll=DL&dl=ACM&CFID=1856933&CFTOKEN=58395003 (Obtained from the internet on Dec. 13, 2010) Aug. 11, 1997 , pp. 127-132.

FreeBSD, "13.8 Groups", *FreeBSD Handbook: Chapter 13 Users and Basic Account Management* http://www.freebsd.org/doc/handbook/users-groups.html (Obtained from the internet on Aug. 25, 2010) No Publication Date Found , 2 pages.

Gorman, Mel , "Understanding the Linux Virtual Memory Manager", http://www.phptr.com/perens 2004 , 748 pages.

IBM, "Concepts, Planning, and Installation Guide", *General Parallel File System, Version 3.1* Apr. 2006 , 144 pages.

IBM, "Snapshots Reinvented: IBM XIV Storage System", Sep. 2008, 17 pages.

IBM, "Welcome to the AIX 6.1 Information Center", http://publib.boulder.ibm.com/infocenter/aix/v6r1/index.jsp?topic=/com.ibm.aix.doc/doc/base/aixinformation.htm (Date Obtained from the Internet Aug. 3, 2010). 1989 , 1 page.

Shepler, S. et al., "NFS version 4 Protocol", *Network Working Group* http://tools.ietf.org/html/rfc3010 (Obtained from the Internet on Aug. 25, 2010) Dec. 2000 , 213 pages.

Sun Microsystems, "Lustre File System: High-Performance Storage Architecture and Scalable Cluster File System", *White Paper* http://www.raidinc.com/pdf/whitepapers/lustrefilesystem_wp.pdf Oct. 2008 , 20 pages.

Tivoli, "Architectural overview of a clustered environment", *Composite Application Manager for Response Time Tracking, Version 6.0* http://publib.boulder.ibm.com/infocenter/tivihelp/v3r1/index.jsp?topic=%2Fcom.ibm.itcamrtt.doc_6.0%2FITCAMfTT_InstallConfig10.htm No Publication Date Found , 3 pages.

IBM Corporation, LDAP Authentication, Sterling B2B Integrator: Security, Chapter 5, Version 5. 2, Copyright 2000, 142 pages.

Luiz Ernesto Pinheiro Malere, Authentication using LDAP, LDAP Linux HOWTO, Additional Information and Features, http://tldp.org/HOWTO/LDAP-HOWTO/authentication.html, Mar. 18, 2007, vol. 10, Chapter 6.2, 2 pages.

Cendio Ab, Authentication against LDAP servers, ThinLinc Administrator's Guide for ThinLinc 3.1.1post, http://www.cendio.com/downloads/updates/b3548/client-cd/doc/adminguide/html/LDAP-auth.html, Copyright 2010, Chapter 9.4, 40 pages.

Erik Webb, Using LDAP for Authentication is Never Best Practice, erikwebb dot net, http://erikwebb.net/blog/using-ldap-authentication-never-best-practice, Published Nov. 6, 2011, 3 pages.

Chandolu et al, Introduction to Domain RBAC, IBM developerWorks, http://www.ibm.com/developerworks/aix/library/au-introdomainrbac/index.html, Sep. 20, 2011, 10 pages.

IBM Corp., Domain RBAC, http://publib.boulder.ibm.com/infocenter/aix/v7r1/index.jsp?topic=/com.ibm.aix.security/doc/security/domain_rbac.htm, accessed on Apr. 29, 2011, Copyright 1989, 2012, 4 pages.

IBM Corp., Role Based Access Control (RBAC), http://publib.boulder.ibm.com/infocenter/aix/v7r1/index.jsp?topic=/com.ibm.aix.security/doc/security/rbac.htm, accessed on Apr. 29, 2011, Copyright 1989, 2012, 1 page.

IBM Corp., Enhanced RBAC Mode, http://publib.boulder.ibm.com/infocenter/aix/v6r1/index.jsp?topic=/com.ibm.aix.security/doc/security/rbac_enh_mode.htm, accessed on Apr. 29, 2011, Copyright 1989, 2012, 2 pages.

Philippe Balbiani et al., A logical approach to dynamic role-based access control, AIMSA '08 Proceedings of the 13th International Conference on Artifical Intelligence: Methodology, Systems, and Applications, Copyright 2008, 17 pages.

FreeBSD, 13.8 Groups, FreeBSD Handbook: Chapter 13 Users and Basic Account Management, http://www.freebsd.org/doc/handbook/users-group.htlm, accessed on Aug. 25, 2010, Copyright 1995, 2012, 2 pages.

Tivoli, "Architectural overview of a clustered environment", Composite Application Manager for Response Time Tracking, Version 6.0, http://publib.boulder.ibm.com/infocenter/tivihelp/v3r1/index.jsp?topic=%2Ecom.ibm.itcamrtt.doc_6.0%2FITCAMfTT_installConfig10.htm, Updated Dec. 7, 2005, 3 pages.

\* cited by examiner

DOMAIN BASED ISOLATION OF OBJECTS

BACKGROUND

Embodiments of the inventive subject matter generally relate to the field of computers, and, more particularly, to domain based isolation of objects.

Conventional UNIX or UNIX-like operating systems implement access control mechanism of coarse granularity. On a UNIX system or UNIX-like system, system administration activities are typically performed through the root account. System administrators responsible for the administration of the system share/manage the password to the root account or use access control tools which allow access to the desired services after sufficient authentication.

SUMMARY

Embodiments include a method comprising determining, in operating system space, that an operation is being attempted on an object identified with an object identifier. A domain identifier associated with the operation is determined. The domain identifier identifies a domain that represents an organizational entity. A plurality of domain isolation rules that indicates rules for allowing operations to proceed on objects based on domain identifiers indicated as permitted for the objects is accessed. The plurality of domain isolation rules is stored in the operating system space. The plurality of domain isolation rules is evaluated with the object identifier and the domain identifier associated with the operation. It is determined whether the operation can proceed on the object based on said evaluating the plurality of domain isolation rules with the domain identifier associated with the operation and the object identifier. A permit indication is returned that indicates that the operation can proceed on the object if the domain isolation rules indicate that the domain identifier represents a domain that has permission for the object. A deny indication that the operation cannot proceed on the object if the domain isolation rules indicate that the domain identifier represents a domain that does not have permission for the object is returned.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
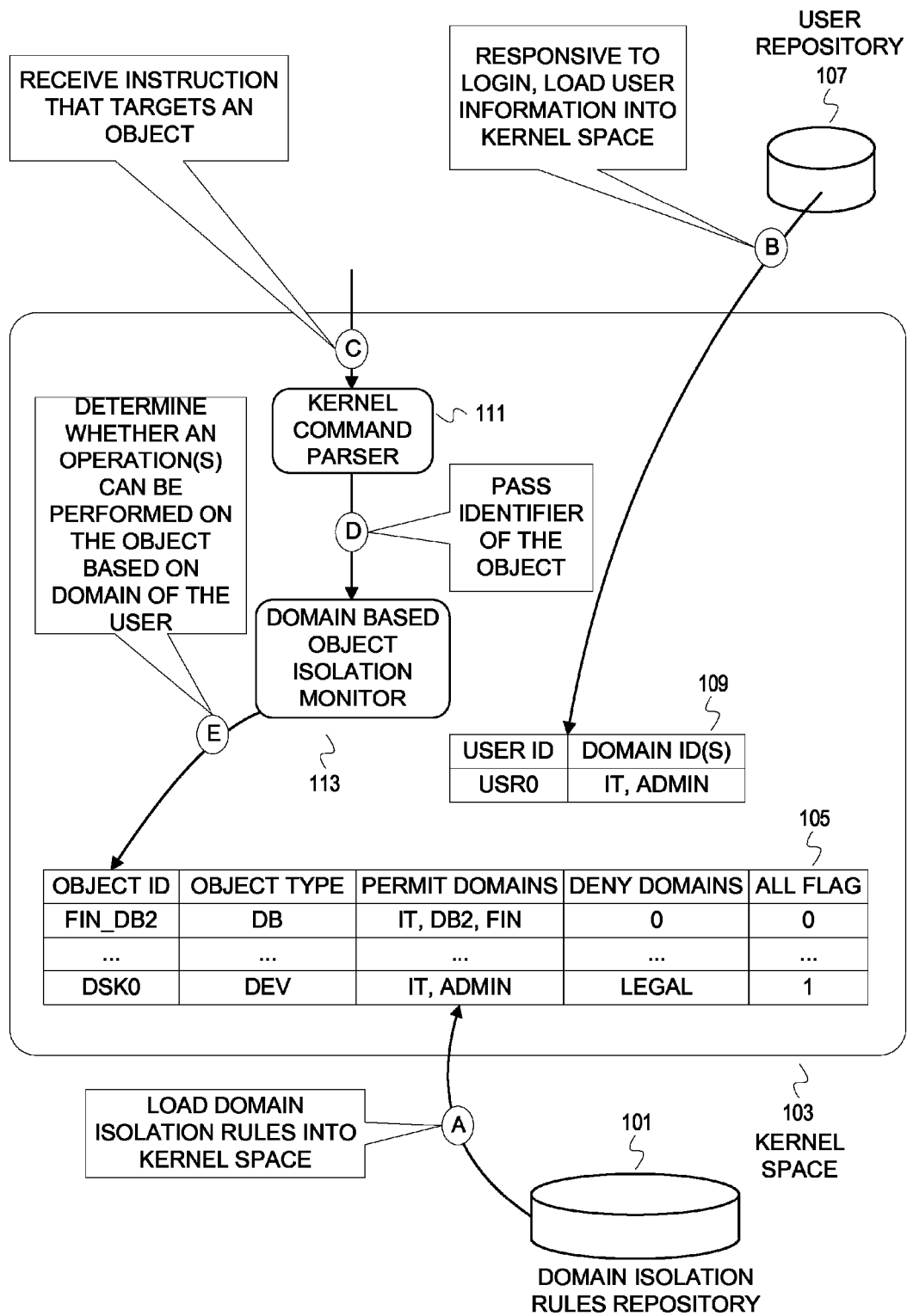
FIG. 1 depicts an example conceptual diagram of a domain based access control enforced in a kernel space.

The description that follows includes example systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

The terms "application," "tool," "utility," and "script are used herein to refer to one or more computer programs. The terms "process" and "instance" are used hereinto refer to an executing computer program or executing part of a computer program. To illustrate, an "operating system instance" refers to an instantiated or executing operating system computer program. A "kernel process" refers to a kernel program or kernel service executing in kernel space. "Kernel space" refers to the execution space of the kernel. The description also uses the term "subject" to refer to executing instances of kernel code, application code, a utility, or a tool.

An operating system ("OS") can support access to objects (e.g., devices, file systems, volume groups, files, etc.) for different departments of an organization and for different purposes (e.g., management of the object, writing to the object, viewing the object, invoking an object, etc.). For instance, an OS can support different applications/systems and data for a legal department, a human resources ("HR") department, and a finance department. The OS can support an electronic mail system for all three departments. The OS can also support a docketing application for the legal department and a bookkeeping application for the finance department. The OS may also support a job application database and employee complaint database for the HR department. An organization may want to isolate the objects for the different departments at a granularity greater than currently available. An administrator can create domains for these different departments to isolate the objects of the departments (e.g., database records, department file systems, etc.) for confidentiality reasons, to conform to organizational task divisions (e.g., different information technology departments may support the different departments), etc.

Functionality can be implemented in an operating system to increase the granularity of isolation for objects. A domain can be defined to represent each of different entities (e.g., different departments or work groups). User identifiers and/or user credentials can be associated with the appropriate domain or domains. For instance, an administrator can configure users as members of particular domains. An administrator can then define a set of rules that govern operation(s) that can be performed on the objects based on the domains. The operations can be in response to commands or instructions from an executing application, executing script, process, etc. Processes or subjects running on a system will inherit the domain or domains of a user account logged into the system. A kernel process, for example, can evaluate the set of rules that specify which domains facilitate access to which objects. When a process or subject attempts to perform an operation on an object (e.g., mount a file system or device, create a volume group, view or write to a file, etc.), the kernel process evaluates the domain inherited by the process, and consequently the operation, and the object against the set of rules to determine whether the operation is permitted to proceed.

FIG. 1 depicts an example conceptual diagram of domain based object isolation enforced in a kernel space. A kernel space 103 comprises a kernel command parser 111 and a domain based object isolation monitor 113. The kernel space 103 represents memory and processes of a kernel on a machine. The kernel command parser 111 represents executing kernel code that parses commands/instructions initiated in user space of the machine hosting the kernel space 103. Although a kernel command parser 111 is not necessarily involved in receiving a command or instruction from user space, FIG. 1 depicts an example involving a command parser to avoid encumbering the description with alternatives.

The machine that hosts the kernel space 103 is communicatively coupled with a user repository 107. The user repository 107 hosts user data (e.g., user credentials, user profiles, etc.) of users that login into the machine. The user data at least includes user identifiers (e.g., usernames, serial numbers, etc.) and associated domains. Each user can be associated with 0 to n domains. When a user is assigned or associated with a domain, the system that manages the user repository 107 updates the corresponding user data to indicate the domain. For instance, a system that supports the creation of domains submits a request to the system that supports the user repository 107 to update a user profile, for example, to indicate a domain. The user repository 107 may be local to the machine that hosts the kernel space 103. The user repository may be distributed throughout a cluster or hosted at a device designated for hosting the user data accessible via a network.

The machine also has access to a domain isolation rules repository 101. The domain isolation rules repository 101 comprises domain isolation rules that indicate which domains are permitted for which objects. A storage device that hosts the domain isolation rules repository 101 can be local or remote with respect to the machine that hosts the kernel space 103.

A root user, super user, or a user with a highest privilege can create domains and domain isolation rules. For instance, a root user can create a domain for IT administrators. The root user can also create a database domain. The root user can define a rule that allows access to manage database objects for users who are assigned to both the IT administrator domain and the database domain. The root user can also define a rule that allows access to manage email objects (e.g., email servers) for users assigned to the IT administrator domain and an "email" domain previously created by the root user.

Defining a domain can comprise establishing an identifier for a domain (e.g., a domain name, a unique numerical identifier, etc.) and a description of the domain. A system that hosts a repository of domains can enforce uniqueness of domain identifiers as unique names and/or generate unique numbers for domains across a node or network. Defining a domain isolation rule comprises indicating an object and a domain(s) that facilitates performance of operation on the object ("permitted domain"). Defining a rule can also comprise specifying a domain that does not facilitate performance of an operation ("denied domain") on the object. For instance, a user may be assigned to an IT domain and a LEGAL domain. A rule may allow a management operation on a particular object if the operation is associated with a user who is a member of the IT domain and an HR domain. A rule may specify that the IT domain is a permitted domain, but the LEGAL domain is a denied domain. Even though the user is a member of the IT domain, an operation associated with the user is not allowed to be performed on an object governed by the rule because the user is also a member of a denied domain. Embodiments can also indicate a flag that represents a constraint of "ANY" or "ALL" domains for an object in a domain isolation rule. If the ALL flag is set in a rule, then an operation associated with a user who is a member of all of the permitted domains indicated in the rule can be performed. Membership in only one of the permitted domains would be insufficient. The ANY or ALL flag can be represented by a single bit or a complex structure. For example, a value of 1 can indicate that ALL domains are required, while a value of 0 can indicate that ANY of the permitted domains is sufficient.

Returning to the example depicted in FIG. 1, a set of domain isolation rules 105 are loaded into the kernel space 103 from the domain isolation rules repository 101 at a stage A. Although embodiments can load all of the domain isolation rules into the kernel space 103, embodiments can also limit loading to a subset of the rules. In addition, the domain isolation rules repository may index or organize rules by various criteria. For example, a set of domain isolation rules can be associated with a particular machine. As another example, domain isolation rules can be loaded after login based on domain membership or credentials of the user that logs into the machine.

At a stage B, user information is loaded into the kernel space 103 from the user repository 107 responsive to a user logging into the machine that hosts the kernel space 103. The user information loaded into the kernel space 103 is instantiated as a user structure instance 109. The user structure instance 109 at least indicates a user identifier and a domain associated with the user represented by the user identifier. In this example, the user identifier is "USR0." The USR0 is a member of the IT domain and the ADMIN domain.

At a stage C, a kernel command parser 111 receives an instruction from user space that targets an object. For example, a user may enter a request to mount a device or increase the size of a filesystem.

At a stage D, the kernel command parser 111 passes an identifier of the object targeted by the instruction to the domain based object isolation monitor 113. For instance, the kernel command parser can call a function that implements the domain based object isolation monitor with the object identifier passed as a parameter. As another example, the kernel command parser 111 can receive a message through a system call which indicates the object identifier to the domain based object isolation monitor 113.

At a stage E, the domain based object isolation monitor 113 determines whether the instruction can be applied to the object (i.e., whether the one or more operations that implement the instruction can be performed on the object) based on the domain(s) of the user associated with the instruction. The domain based object isolation monitor 113 accesses the set of domain isolation rules 105. The set of domain isolation rules 105 indicates an object identifier, an object type, permitted domains, denied or conflict domains, and an ANY or ALL flag. The set of domain isolation rules 105 includes a rule that indicates a database object "FIN_DB2" can be operated upon by an operation(s) associated with any one of the domains IT, DB2, and finance ("FIN"). The set of domain isolation rules 105 also includes a rule that permits access to a device object "DSK0" by an operation(s) associated with a user who is a member of all of the domains IT and ADMIN. Since the USR0 is a member of both the IT domain and the ADMIN domain, a command/instruction that targets the device DSK0 would be allowed to proceed. If the command/instruction targeted the FIN_DB2 object, then the operation(s) that implement the command/instruction would not be permitted to operate upon the FIN_DB2 object.

Although the depicted example refers to a command, embodiments are not so limited. Embodiments can determine whether an operation being performed by an application is permitted to operate upon or access an object. The application would be executing as a process in a user space invoked by a user. The application process inherits the domain of the user. Thus, the corresponding domain identifier of that user would be used to evaluate the set of domain isolation rules against the operation for the object. In addition, embodiments are not limited to specifying particular object identifiers. An administrator can define a rule that governs access to manage types of objects. The administrator could indicate an ANY flag or a wildcard for the object identifier and specify an object type. When the domain based object isolation monitor encounters the wildcard or object identifier ALL flag, then the monitor would evaluate the rule against the type of object that an operation is attempting to operate upon. Further, embodiments are not limited to specifying permitted domains. An embodiment can evaluate a rule that only specifies a denied or conflict domain as allowing all domains not indicated as a denied or conflict domain.

Figure 2:
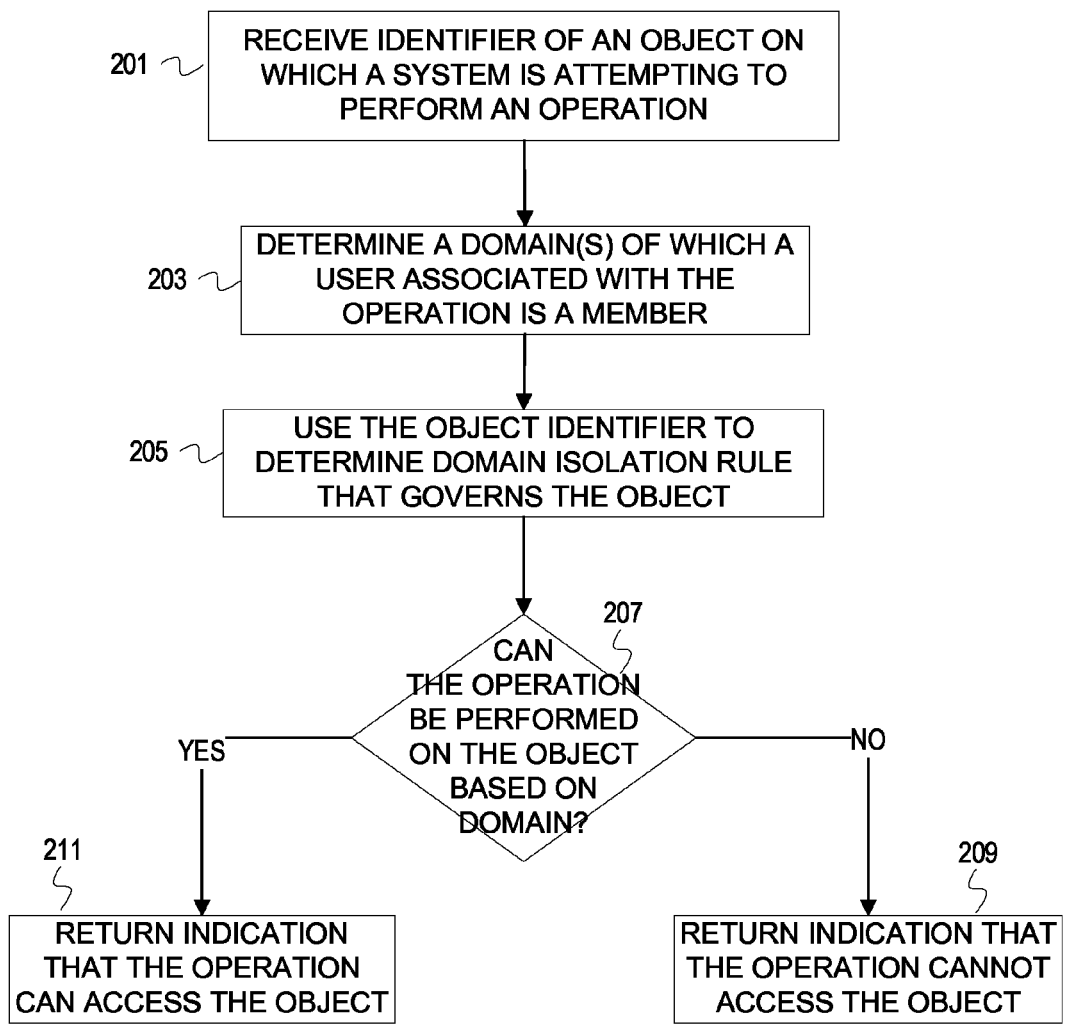
FIG. 2 depicts a flowchart of example operations for evaluating a domain isolation rule for an object.

FIG. 2 depicts a flowchart of example operations for evaluating a domain isolation rule for an object. An object identifier is received that identifies an object on which a system is attempting to perform an operation(s) (201). The object identifier identifies an object that is targeted by a command, an application, an instruction, invoked function, etc. For instance, the user is attempting to modify size of a file system or remove a volume group. As stated earlier, the object identifier may be indicated in a function call, an instruction in an executing script, an operation originating from a utility, an application, etc. The set of one or more operations may be implementing a command or instruction that originates from a command line, application instance, operating system process, background process, etc.

A domain(s) to which the user belongs is determined (203). For instance, the user may be a member of a human resources domain. When user data (e.g., credentials, profile, etc.) that represents a user account logged into a system is loaded, the domain identifier(s) indicated in the user data can be stored at a known or reserved location in the operating system space. When evaluating a domain isolation rule, an operating system process can access the known or reserved operating system space location for the domain identifier(s).

The object identifier is used to determine a domain isolation rule that governs the object (205). A set of domain isolation rules can be indexed by object identifiers. For instance, a kernel process locates a domain isolation rule using the object identifier as an index.

It is determined if the operation being attempted can be performed on the object based on domain membership (207). A kernel process evaluates the located domain isolation rule for the object and determines whether the domain of the user is indicated as a permitted domain. The kernel process may also determine whether the rule indicates that a user is required to be a member of all indicated permitted domains, or if the user is a member of a denied or conflict domain. If operation is permitted to be performed on the object, then operations continue at block 211. If operation is not permitted to be performed on the object, then operations continue at block 209.

An indication is returned that the operation is not permitted to be performed on the object if the user is determined to be a member of a denied domain or is not a member of a permitted domain (209). If the user is not a member of a permitted domain, then the operation initiated by or associated with the user cannot be carried out. A denied indication can be returned to the invoking code (e.g., a command parser). A notification can then be displayed that access is not permitted. For example, an error message can be displayed.

If the user credentials indicate a domain membership that satisfies the domain isolation rule for the object, then an indication is returned that the operation can be performed on the object (211). For instance, an allow indication is returned to a command parser, which allows the operation to be carried out.

The depicted flowchart is intended to aid in understanding the inventive subject matter, and should not be used to limit embodiments. Embodiments can perform additional operations, fewer operations, operations in a different order, operations in parallel, etc., than depicted herein. For instance, an indication may not be returned that an operation is not permitted access to an object. The executing code that evaluates the domain isolation rule may invoke an error handler or generate the deny message itself. Further, the domain isolation rules may not be indexed by object identifier. The domain isolation rules can be indexed by object type and then by object identifier. Hence, the rule evaluation code would determine the type of the object and initially access the domain isolation rules with the object type.

Domain based isolation of objects can be used in a system or an operating system that also implements a role based access control environment. Domain based isolation can provide an additional layer of control/security at a different degree of granularity than role based access. The use of domain based object isolation within a role based access control (RBAC) environment provides greater configuration flexibility. To illustrate, a user A may be associated with an administrator role. The administrator role is configured to allow performance of operations to mount devices and/or filesystems. The user A, in this illustration, is a member of a domain FINANCE. A root user configured a set of domain isolation rules to indicate the FINANCE domain as a permitted domain for a device DSK1, and to indicate a domain HR as a permitted domain for a device DSK2. If the user A attempts to mount the device DSK1, the operating system will allow the operation(s) to mount DSK1 to proceed. If the user A attempts to mount the device DSK2, the operating system will enforce the domain isolation rule for DSK2 and not allow the user A to mount DSK2. Hence, an organization can restrict operations, which are performed by a system responsive to commands and/or instructions, based on roles, and isolate objects based on domains. The permutation of domains and roles provides an organization with substantial flexibility to secure and manage resources. Embodiments can implement role based access control with domain based object isolation differently. For instance, role of a user can be evaluated before proceeding to evaluate a corresponding domain isolation rule. Alternatively, a domain isolation rule can be evaluated before evaluating role. In addition, a domain isolation rule can be evaluated in parallel with role of a user.

Furthermore, maintenance type operations are not depicted in the above figures. Embodiments can regulate removal of a domain from a node or machine based on disassociation from the associated object. Embodiments may regulate disassociation of domains from objects or removing of domain identifiers from domain isolation rules to avoid unintended release of an object from domain isolation. For example, a system may prevent a domain isolation rule from being modified to remove a domain A, unless other domains are specified. So, a domain PAYROLL could be disassociated from an object DSK0, as long as the domain PAYROLL is not the sole domain associated with the object DSK0. When attempting to remove an object, an interface can be displayed that indicates all domains associated with the object. The interface can allow an administrator to disassociate each of the domains from the object to allow removal of the object. Embodiments, however, are not constrained to preventing removal of objects until domain disassociation. In addition, domain isolation rules can be automatically updated or manually updated when a domain is removed. For instance, a repository of domains with their descriptions such as domain names and domain ids can be maintained. When an attempt is made to delete a domain, the maintenance code can provide some indication of the objects and/or domain isolation rules associated with the domain. A prompt can be displayed to confirm that the domain should be disassociated from the objects and removed from the domain isolation rules.

In another embodiment, the domain based access control of objects can be implemented with domain based access control lists. Examples objects that can be governed by domain isolation rules and a domain based access control list include files, file sets, and directories. Domains can be granted different permissions to file type objects. An IT domain may be granted read permission of a file, but not write permission for that file. Write permissions for financial files of a services division of a corporation can be restricted to users who are members of an accounting domain and a services domain. For instance, viewing of a file set may be controlled by domain isolation rules, and access permissions to individual files within that file set can be controlled by a domain based access control list (ACL).

Figure 3:
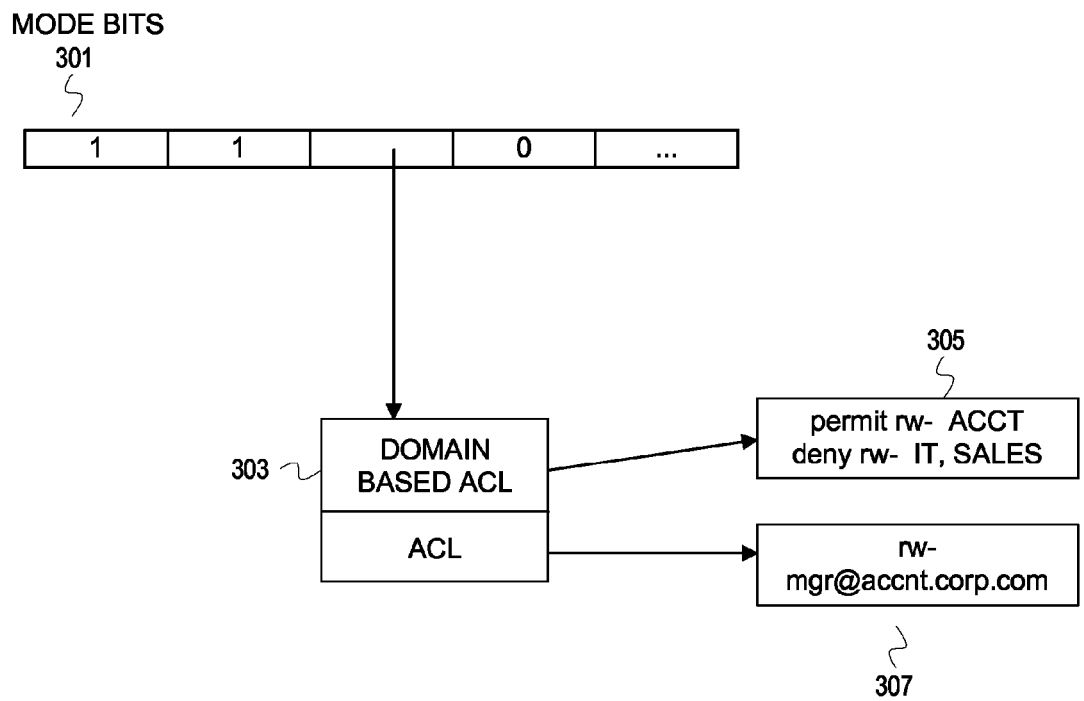
FIG. 3 depicts an example conceptual diagram of a domain based access control list.

FIG. 3 depicts an example conceptual diagram of a domain based access control list. A file's mode bits structure 301 comprises mode bits and a reference to an access control list structure 303. A system does not necessarily use all of the mode bits, but the initial mode bits can be used to control access to the access control lists themselves. In response to a system call to determine permissions for a file, an operating system process examines the mode bits structure 301 and determines that a set of access control lists are associated with the file.

The operating system process determines that the file is associated with a domain based access control list 305 and a non-domain based access control list 307 (e.g., POSIX ACL, NFSv4 ACL). The operating system process makes the determination with an access control list structure 303. The access control list structure 303 can be an array or linked list, for example, of references to various access control lists that specify permissions on the file.

The operating system process follows the reference to the domain based access control list 305. In this example, the domain based access control list 305 indicates that members of a domain ACCT are permitted read and write permission to the associated file. The domain based access control list 305 also specifies that members of the domains IT and SALES should be denied read and write permission to the associated file. The operating system process evaluates the domains of a current user against the domain based access control list 305 to determine permissions to grant or deny for the associated file or directory. Embodiments can indicate the domain based access control list 305 in extended attributes of a file or file metadata.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
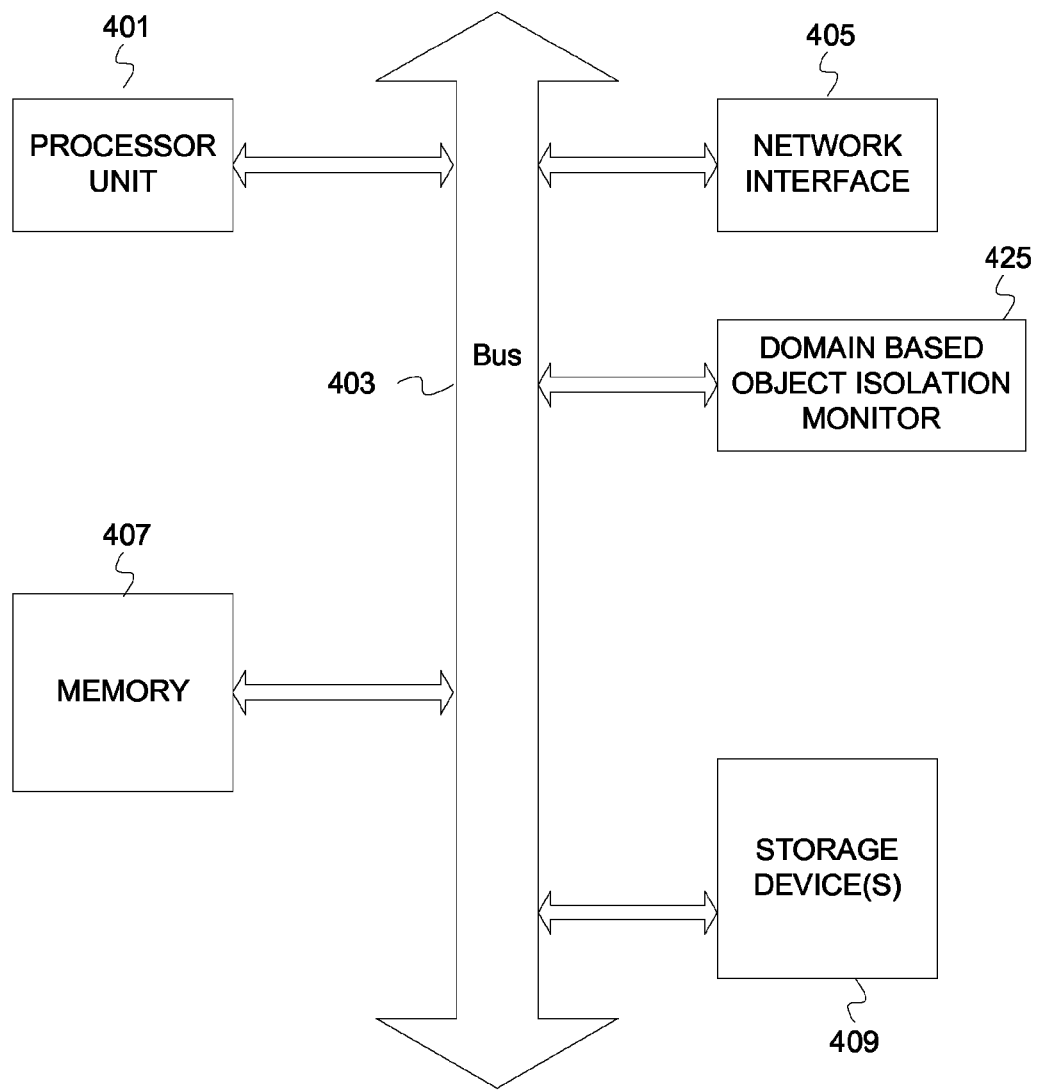
FIG. 4 depicts an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport® bus, InfiniBand® bus, NuBus bus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The example computer system also comprises a domain based object isolation monitor 425 that is coupled with the bus 403. The domain based object isolation monitor determines whether a user can access (via a command, script operation, or an application operation) an object based on domain membership of the user. The domain based access monitor 425 evaluates a domain isolation rule that governs access to the object based with respect to domain membership of the user. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for isolating objects of a system based on domains as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining, in operating system space, that an operation is being attempted on an object identified with an object identifier;
   determining a domain identifier associated with the operation, wherein the domain identifier identifies a domain that represents an organizational entity of a plurality of domains representing a plurality of organizational entities;
   accessing from a kernel space associated with the operating system space a plurality of domain isolation rules that indicate rules for allowing operations to proceed on objects based on domain identifiers indicated as permitted for the objects, wherein the plurality of domain isolation rules are stored in the kernel space;
   evaluating the plurality of domain isolation rules with the object identifier and the domain identifier associated with the operation;
   determining whether the operation can proceed on the object based on said evaluating the plurality of domain isolation rules with the domain identifier associated with the operation and the object identifier;
   determining that a plurality of domain identifiers are associated with the object identifier of the object;
   determining whether the plurality of domain identifiers includes the domain identifier associated with the operation;
   evaluating the domain isolation rules for an indication of whether any or all of the domain identifiers associated with the object identifier are required by the operation for permission to access the object;
   returning a permit indication that the operation can proceed on the object if the domain isolation rules indicate that the domain identifier represents a domain that has permission for the object; and
   returning a deny indication that the operation cannot proceed on the object if the domain isolation rules indicate that the domain identifier represents a domain that does not have permission for the object.

2. The method of claim 1, wherein the object comprises one of a file, a file system, a volume group, a file set, and a device.

3. The method of claim 1, wherein the operation is initiated by one of an application process, an operating system process, a script process, a tool process, a command process, and a utility process.

4. The method of claim 1 further comprises storing an association of a user identifier and the domain identifier in the kernel space.

5. The method of claim 1 further comprising:
   determining that the operation is associated with a second domain identifier;
   determining whether the domain isolation rule for the object indicates that all of the plurality of domain identifiers associated with the object identifier are required to be associated with the operation to permit access to the object;
   determining that the operation can proceed if the plurality of domain identifiers consists of the domain identifier and the second domain identifier associated with the operation;
   determining that the operation cannot proceed if the plurality of domain identifiers comprises more than the domain identifier and the second domain identifier associated with the operation.

6. The method of claim 1, wherein said determining the domain identifier associated with the operation comprises determining that the domain identifier is indicated in user data that represents a user account logged into a machine that hosts the operating system space.

7. The method of claim 1 further comprising:
after returning the permit indication that the operation can proceed on the object, determining that the object is associated with a plurality of access control lists;
selecting a first of the plurality of access control lists, wherein the first access control list corresponds to domains; and
determining that the first access control list indicates the domain identifier has one of read, write, and execute permission on the object.

8. The method of claim 1 further comprising loading the plurality of domain isolation rules into the operating system space from the kernel space.

9. A computer program product for domain based object isolation, the computer program product comprising:
a computer readable storage medium having computer usable program code embodied therewith, the computer usable program code executable to cause a computer to perform:
determining, in operating system space, that an operation is being attempted on an object identified with an object identifier;
determining a domain identifier associated with the operation, wherein the domain identifier identifies a domain that represents an organizational entity of a plurality of domains representing a plurality of organizational entities;
accessing from a kernel space associated with the operating system space a plurality of domain isolation rules that indicate rules for allowing operations to proceed on objects based on domain identifiers indicated as permitted for the objects, wherein the plurality of domain isolation rules are stored in the kernel space;
evaluating the plurality of domain isolation rules with the object identifier and the domain identifier associated with the operation;
determining whether the operation can proceed on the object based on said evaluating the plurality of domain isolation rules with the domain identifier associated with the operation and the object identifier;
determining that a plurality of domain identifiers are associated with the object identifier of the object;
determining whether the plurality of domain identifiers includes the domain identifier associated with the operation;
evaluating the domain isolation rules for an indication of whether any or all of the domain identifiers associated with the object identifier are required by the operation for permission to access the object;
returning a permit indication that the operation can proceed on the object if the domain isolation rules indicate that the domain identifier represents a domain that has permission for the object; and
returning a deny indication that the operation cannot proceed on the object if the domain isolation rules indicate that the domain identifier represents a domain that does not have permission for the object.

10. The computer program product of claim 9, wherein the object comprises one of a file, a file system, a volume group, a file set, and a device and the operation is initiated by one of an application process, an operating system process, a script process, a tool process, a command process, and a utility process.

11. The computer program product of claim 9, wherein the computer usable program code is further executable to cause a computer to store an association of a user identifier and the domain identifier in the kernel space responsive to receiving user credentials.

12. The computer program product of claim 9, wherein said determining whether the operation can proceed on the object comprises:
determining that a plurality of domain identifiers are indicated as having permission for the object; and
determining whether the plurality of domain identifiers includes the domain identifier associated with the operation.

13. The computer program product of claim 12, wherein the computer usable program code is further executable to cause a computer to:
determine that the operation is associated with a second domain identifier;
determine whether the domain isolation rule for the object indicates that all of the plurality of domain identifiers are required for the object;
determine that the operation can proceed if the plurality of domain identifiers consists of the domain identifier and the second domain identifier associated with the operation;
determine that the operation cannot proceed if the plurality of domain identifiers comprises more than the domain identifier and the second domain identifier associated with the operation.

14. The computer program product of claim 9, wherein said determining the domain identifier associated with the operation comprises determining that the domain identifier is indicated in user data that represents a user account logged into a machine that hosts the operating system space.

15. The computer program product of claim 9, wherein the computer usable program code is further executable to cause a computer to:
after returning the permit indication that the operation can proceed on the object, determine that the object is associated with a plurality of access control lists;
select a first of the plurality of access control lists, wherein the first access control list corresponds to domains; and
determine that the first access control list indicates the domain identifier has one of read, write, and execute permission on the object.

16. The computer program product of claim 9, wherein the computer usable program code is executable to further cause a computer to load the plurality of domain isolation rules into the kernel space.

17. An apparatus comprising:
a processor unit;
a network interface coupled with the processor unit; and
a domain based object isolation monitor operable to,
determine in operating system space, that an operation is being attempted on an object identified with an object identifier;
determine a domain identifier associated with the operation, wherein the domain identifier identifies a domain that represents an organizational entity of a plurality of domains representing a plurality of organizational entities;
access from a kernel space associated with the operating system space a plurality of domain isolation rules that indicate rules for allowing operations to proceed on objects based on domain identifiers indicated as permitted for the objects, wherein the plurality of domain isolation rules are stored in the kernel space;

evaluate the plurality of domain isolation rules with the object identifier and the domain identifier associated with the operation;

determine whether the operation can proceed on the object based on said evaluating the plurality of domain isolation rules with the domain identifier associated with the operation and the object identifier;

determine that a plurality of domain identifiers are associated with the object identifier of the object;

determine whether the plurality of domain identifiers includes the domain identifier associated with the operation;

evaluate the domain isolation rules for an indication of whether any or all of the domain identifiers associated with the object identifier are required by the operation for permission to access the object;

return a permit indication that the operation can proceed on the object if the domain isolation rules indicate that the domain identifier represents a domain that has permission for the object; and return a deny indication that the operation cannot proceed on the object if the domain isolation rules indicate that the domain identifier represents a domain that does not have permission for the object.

18. The method of claim 1 further comprising:

determining that the operation is associated with a second domain identifier;

determining whether the domain isolation rules for the object indicates that any of domain identifier or second domain identifier are required for the object;

determining that the operation can proceed if the domain isolations rules indicate that the plurality of domain identifiers associated with the object identifier includes at least one of the domain identifier and the second domain identifier associated with the operation;

determining that the operation cannot proceed if the domain isolation rules indicate that the plurality of domains associated with the object identifier does not include either the domain identifier or the first domain identifier as associated with the operation.

19. The method of claim 1 further comprising:

determining, in the operating system space, that the operation is being attempted on an object by a user;

determining a user identifier associated with the user, wherein the user identifier uniquely identifies the user from a plurality of users;

evaluating a set of login rules to determine if the user identifier is permitted login access to the operating system space;

wherein the user identifier is unassociated with any object or object identifier and the domain identifier identifies a domain that represents an organizational entity, each organizational entity being comprised of a plurality of users.

* * * * *